United States Patent
Cho et al.

(10) Patent No.: US 10,541,427 B2
(45) Date of Patent: Jan. 21, 2020

(54) CARRIER-NANOPARTICLE COMPOSITE, CATALYST CONTAINING SAME, AND METHOD FOR PRODUCING SAME

(71) Applicant: LG CHEM, LTD., Seoul (KR)

(72) Inventors: Jun Yeon Cho, Daejeon (KR); Kwanghyun Kim, Daejeon (KR); Sang Hoon Kim, Daejeon (KR); Ran Choi, Daejeon (KR); Gyo Hyun Hwang, Daejeon (KR); Wonkyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 102 days.

(21) Appl. No.: 15/779,833

(22) PCT Filed: Feb. 2, 2017

(86) PCT No.: PCT/KR2017/001152
§ 371 (c)(1),
(2) Date: May 29, 2018

(87) PCT Pub. No.: WO2017/135709
PCT Pub. Date: Aug. 10, 2017

(65) Prior Publication Data
US 2018/0375108 A1  Dec. 27, 2018

(30) Foreign Application Priority Data
Feb. 2, 2016 (KR) .................. 10-2016-0012913

(51) Int. Cl.
*H01M 4/92* (2006.01)
*H01M 8/1004* (2016.01)
(Continued)

(52) U.S. Cl.
CPC ............. *H01M 4/928* (2013.01); *B01J 23/16* (2013.01); *B01J 23/38* (2013.01); *B01J 23/70* (2013.01);
(Continued)

(58) Field of Classification Search
CPC .... H01M 4/928; H01M 4/9083; H01M 4/926; H01M 4/8892; H01M 8/1004; B01J 32/00
See application file for complete search history.

(56) References Cited

U.S. PATENT DOCUMENTS

2006/0019146 A1  1/2006  Yoshitake et al.
2006/0105226 A1  5/2006  Kim et al.
(Continued)

FOREIGN PATENT DOCUMENTS

EP  3216521  9/2017
JP  2003346814  12/2003
(Continued)

OTHER PUBLICATIONS

Geng et al. "In Situ Synthesis and Characterization of Polyethyleneimine-Modified Carbon Nanotubes Supported PtRu Electrocatalyst for Methanol Oxidation," Journal of Nanomaterials 2015: 1-10 (2015).
XP-002784783, "Polyethylenimin," Wikipedia, English Translation provided.
Park et al., "Electrochemical properties of polyethyleneimine-functionalized Pt-PEI/carbon black as a catalyst for polymer electrolyte membrane fuel cell," Electrochimica Acta 125:141-148 (2014).

*Primary Examiner* — Stewart A Fraser
(74) *Attorney, Agent, or Firm* — Dentons US LLP

(57) ABSTRACT

The present specification relates to a carrier-nanoparticle complex, a catalyst including the same, an electrochemical battery or a fuel cell including the catalyst, and a method for preparing the same.

14 Claims, 16 Drawing Sheets

(51) Int. Cl.
*H01M 4/90* (2006.01)
*H01M 4/88* (2006.01)
*B01J 32/00* (2006.01)
*H01M 4/86* (2006.01)
*B01J 23/16* (2006.01)
*B01J 23/38* (2006.01)
*B01J 23/70* (2006.01)
*H01M 8/1018* (2016.01)

(52) U.S. Cl.
CPC ........... *B01J 32/00* (2013.01); *H01M 4/8621* (2013.01); *H01M 4/8657* (2013.01); *H01M 4/8663* (2013.01); *H01M 4/8668* (2013.01); *H01M 4/8875* (2013.01); *H01M 4/8892* (2013.01); *H01M 4/9041* (2013.01); *H01M 4/9083* (2013.01); *H01M 4/9091* (2013.01); *H01M 4/926* (2013.01); *H01M 8/1004* (2013.01); *H01M 2008/1095* (2013.01); *Y02P 70/56* (2015.11)

(56) References Cited

U.S. PATENT DOCUMENTS

| | | | |
|---|---|---|---|
| 2009/0192297 A1* | 7/2009 | Yoshida | C12N 11/14 530/402 |
| 2013/0288155 A1* | 10/2013 | Kim | H01M 4/926 429/483 |
| 2015/0099207 A1 | 4/2015 | Yamaguchi et al. | |

FOREIGN PATENT DOCUMENTS

| | | |
|---|---|---|
| JP | 2008173524 | 7/2008 |
| JP | 2013-105668 | 5/2013 |
| KR | 10-0647296 | 11/2006 |
| KR | 10-2013-0122507 | 11/2013 |

\* cited by examiner

[Figure 1]
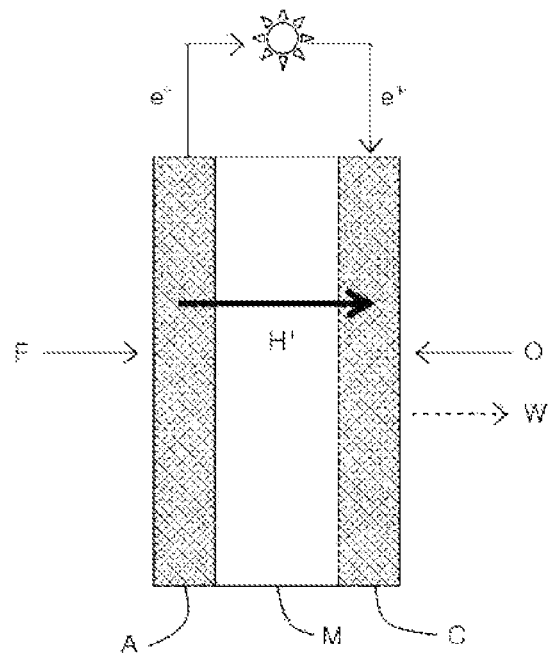
[Figure 2]
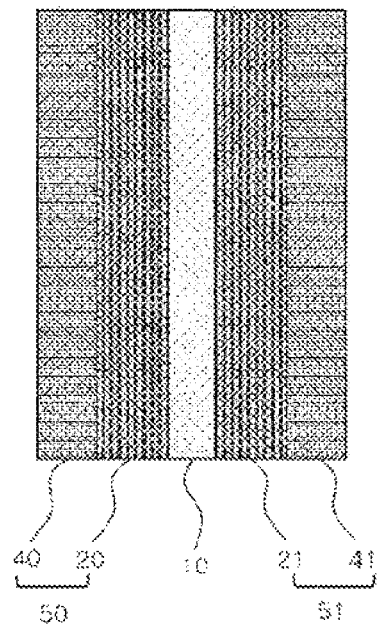

[Figure 3]
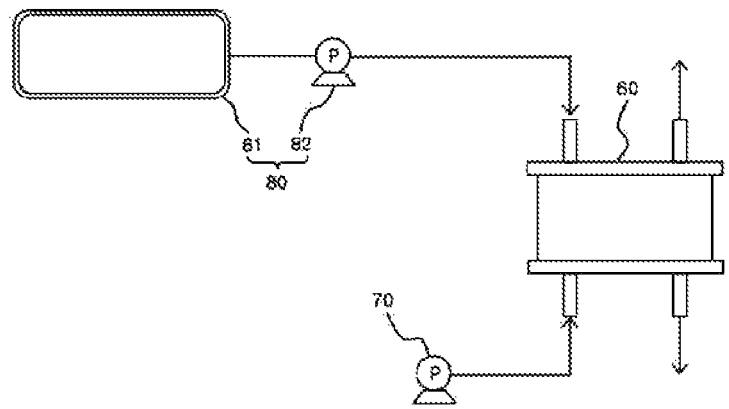
[Figure 4]
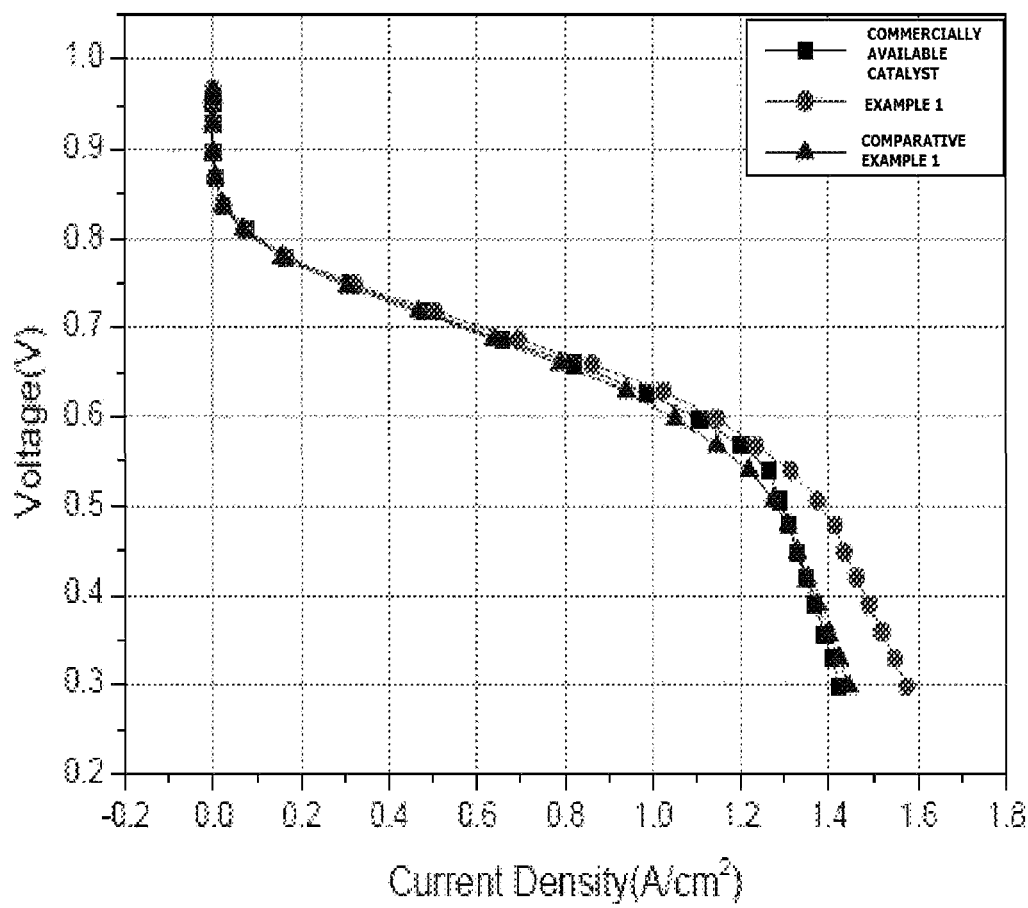

[Figure 5]
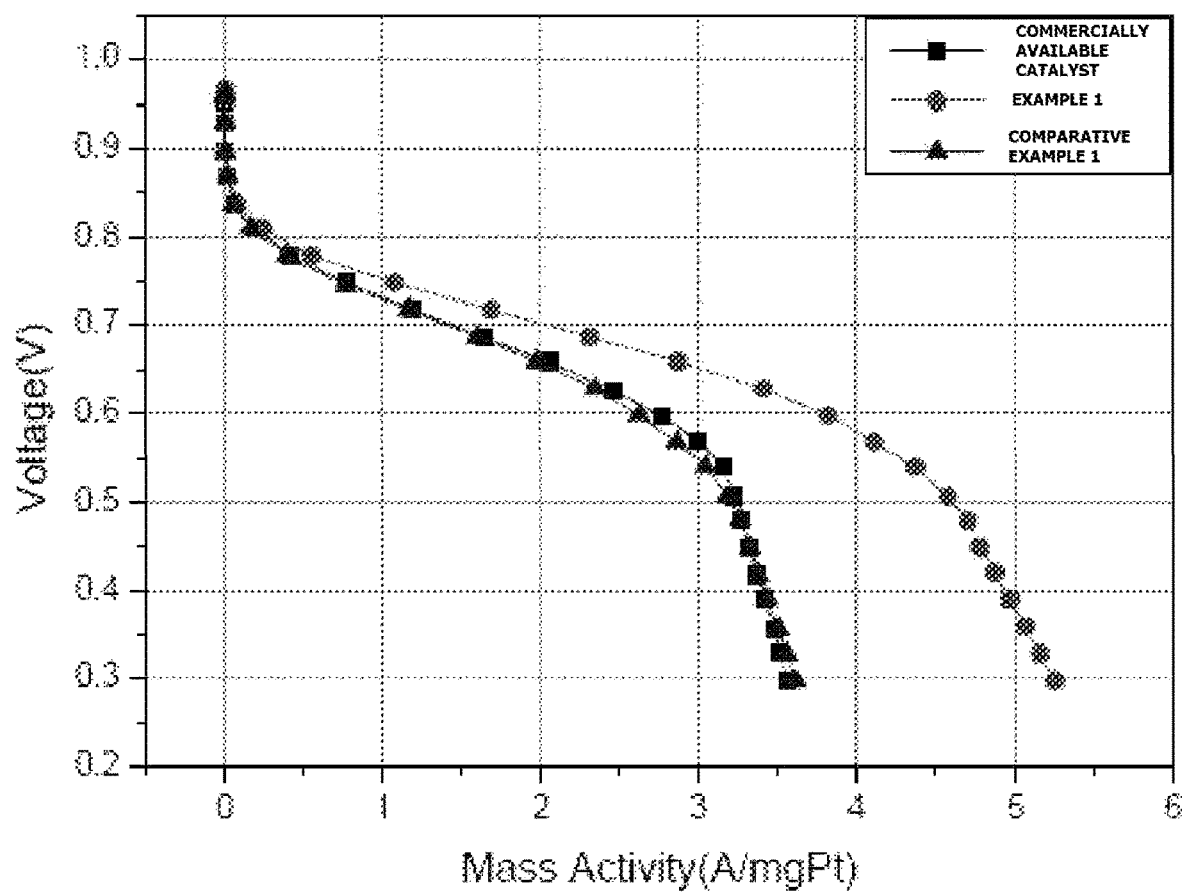

[Figure 6]
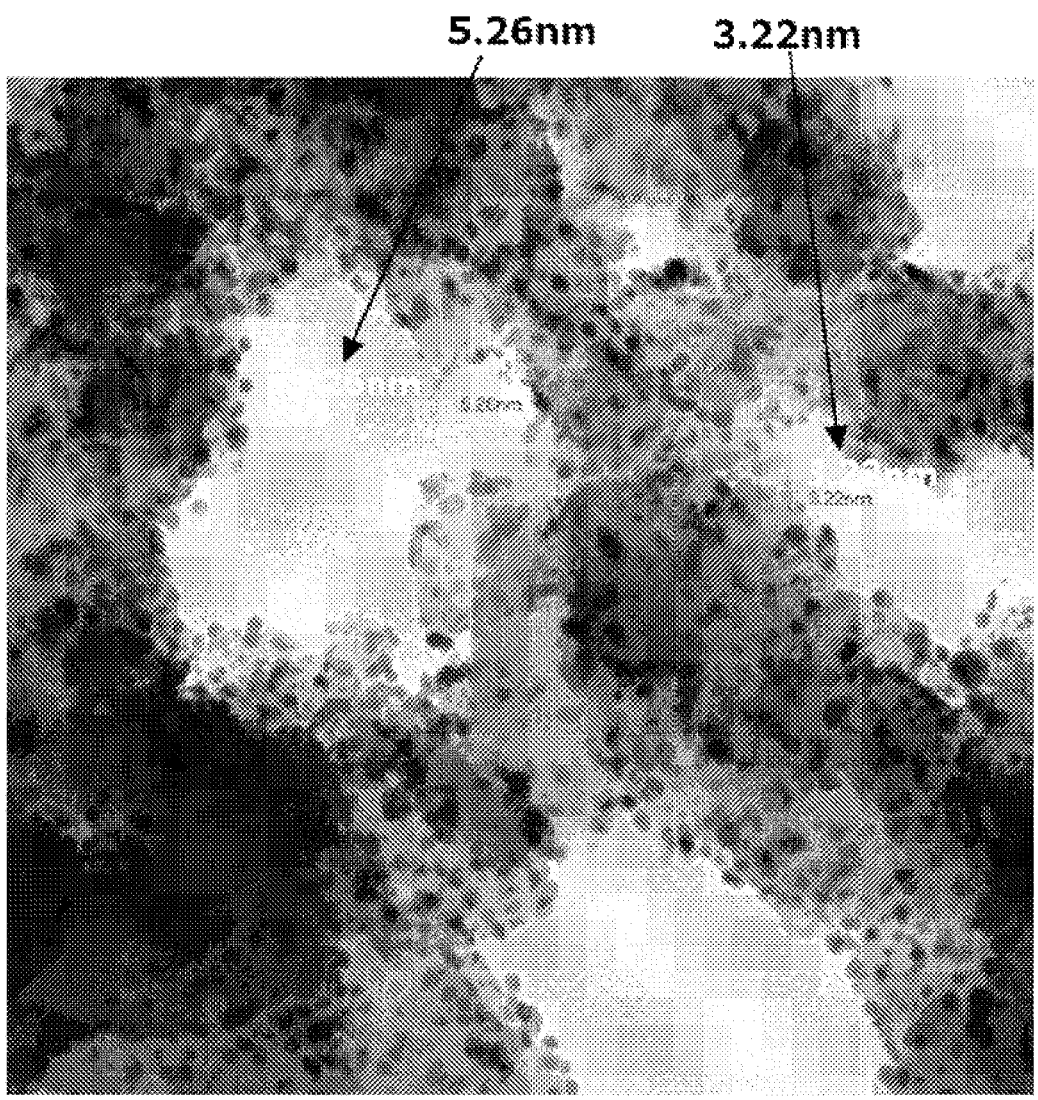

[Figure 7]
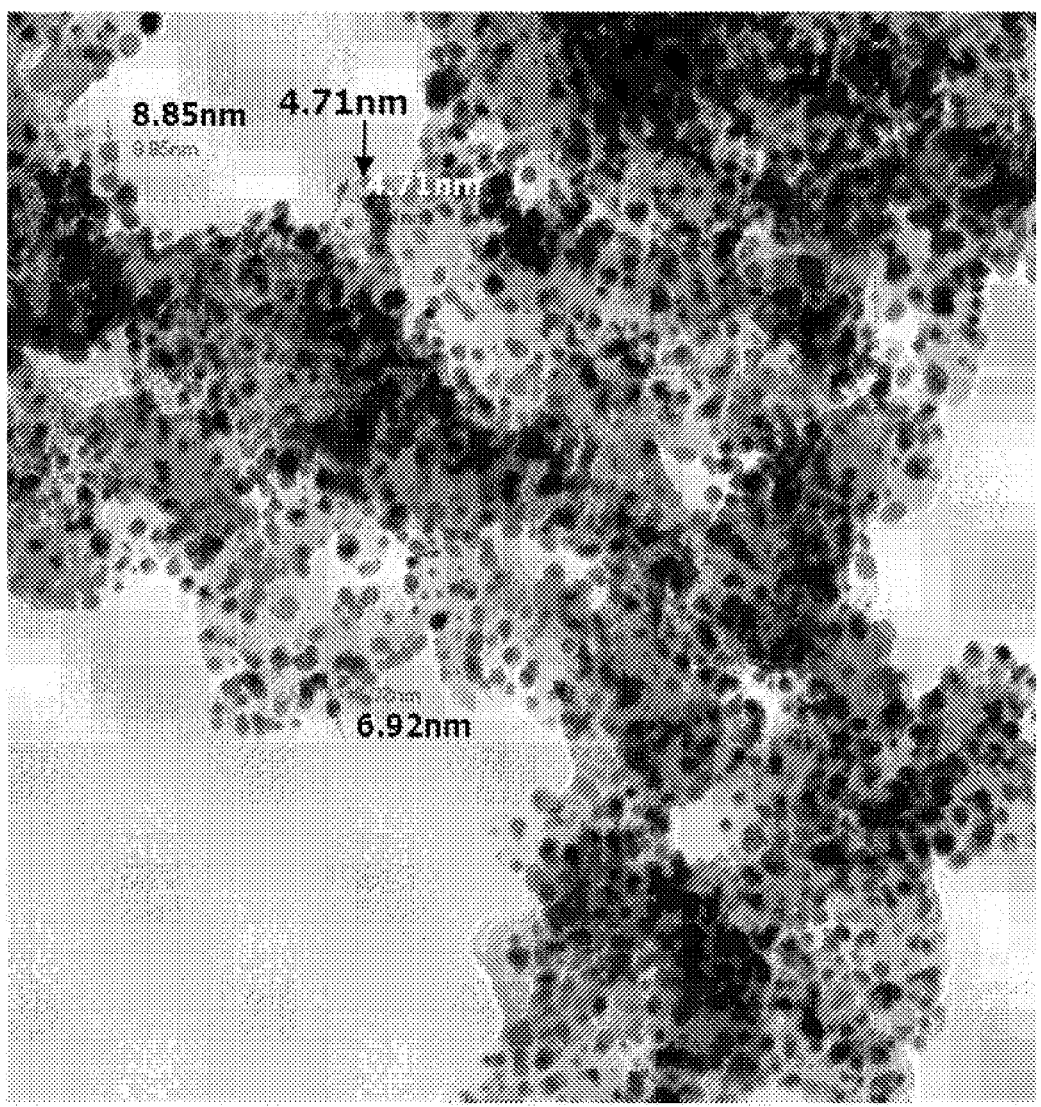

[Figure 8]
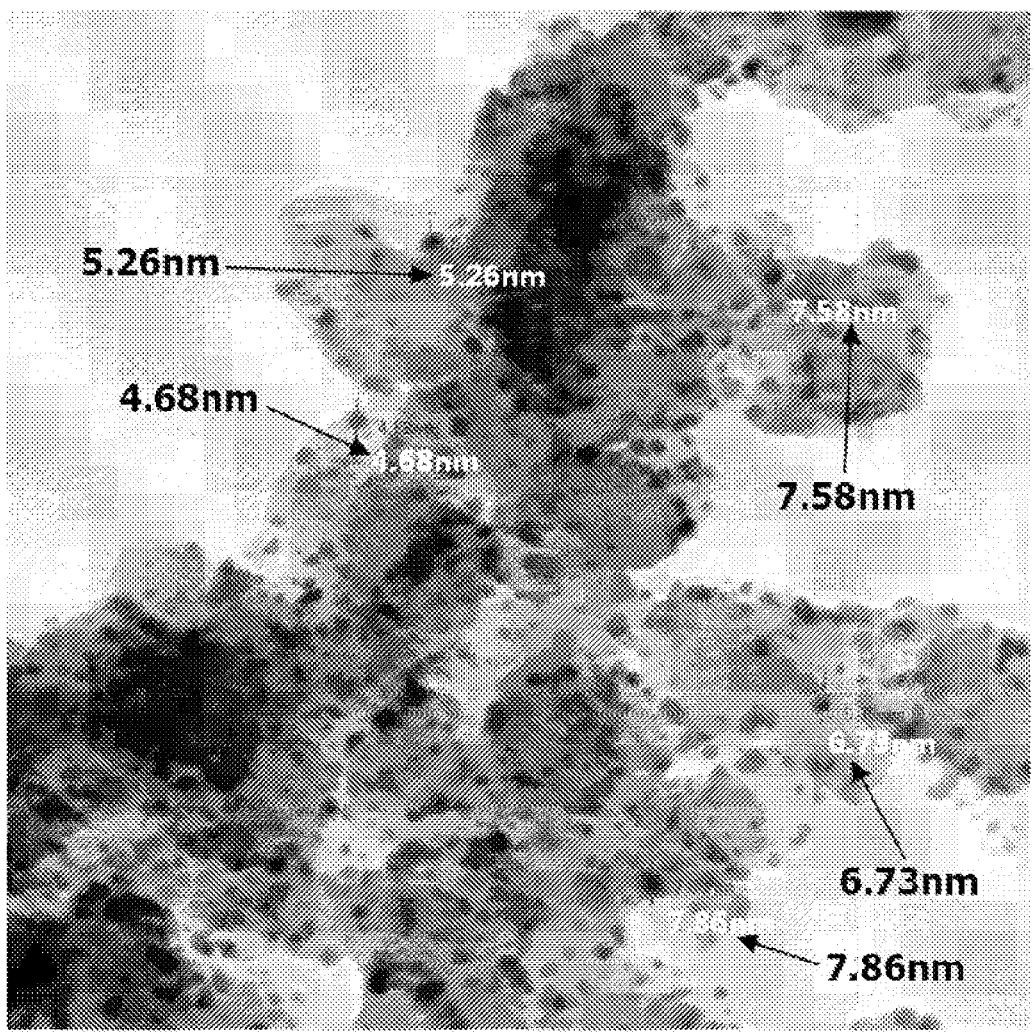

[Figure 9]
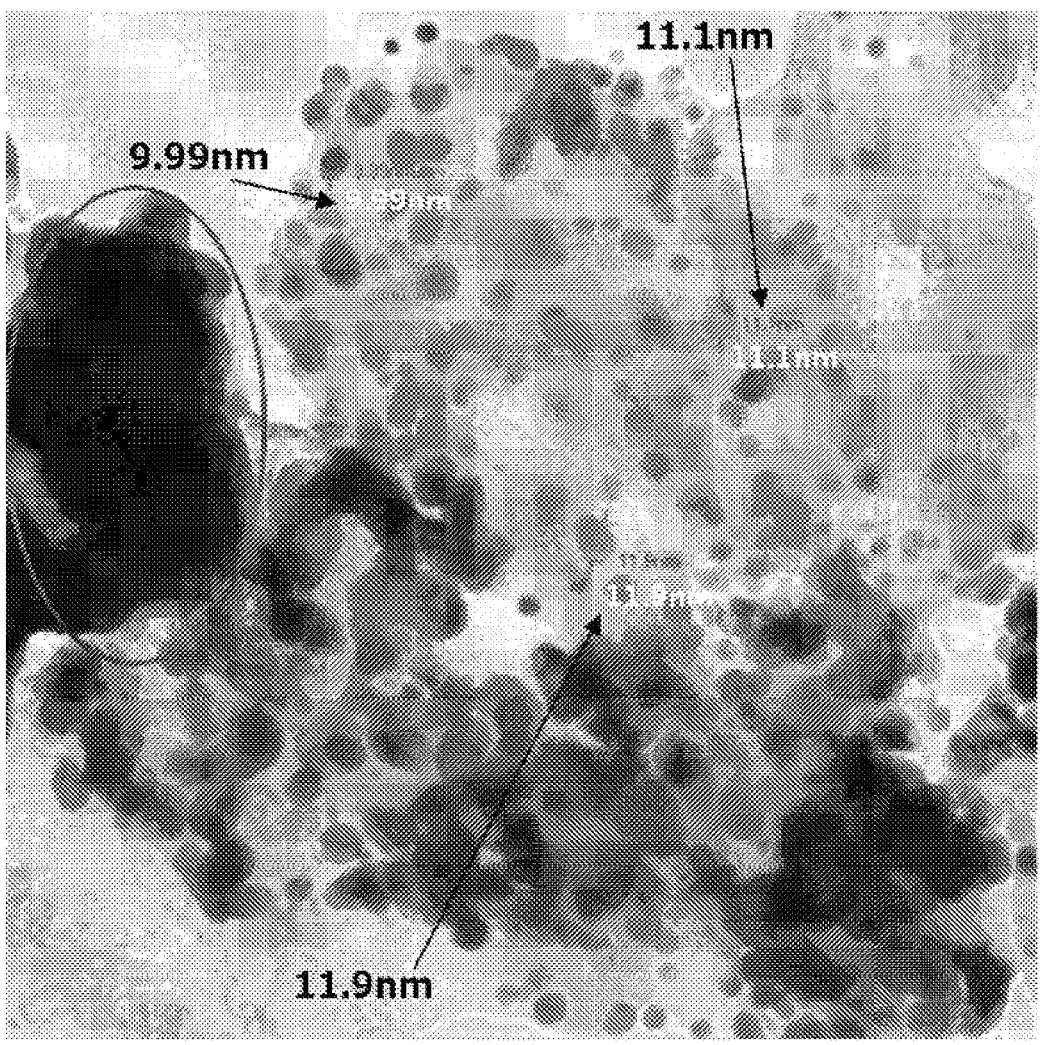

[Figure 10]
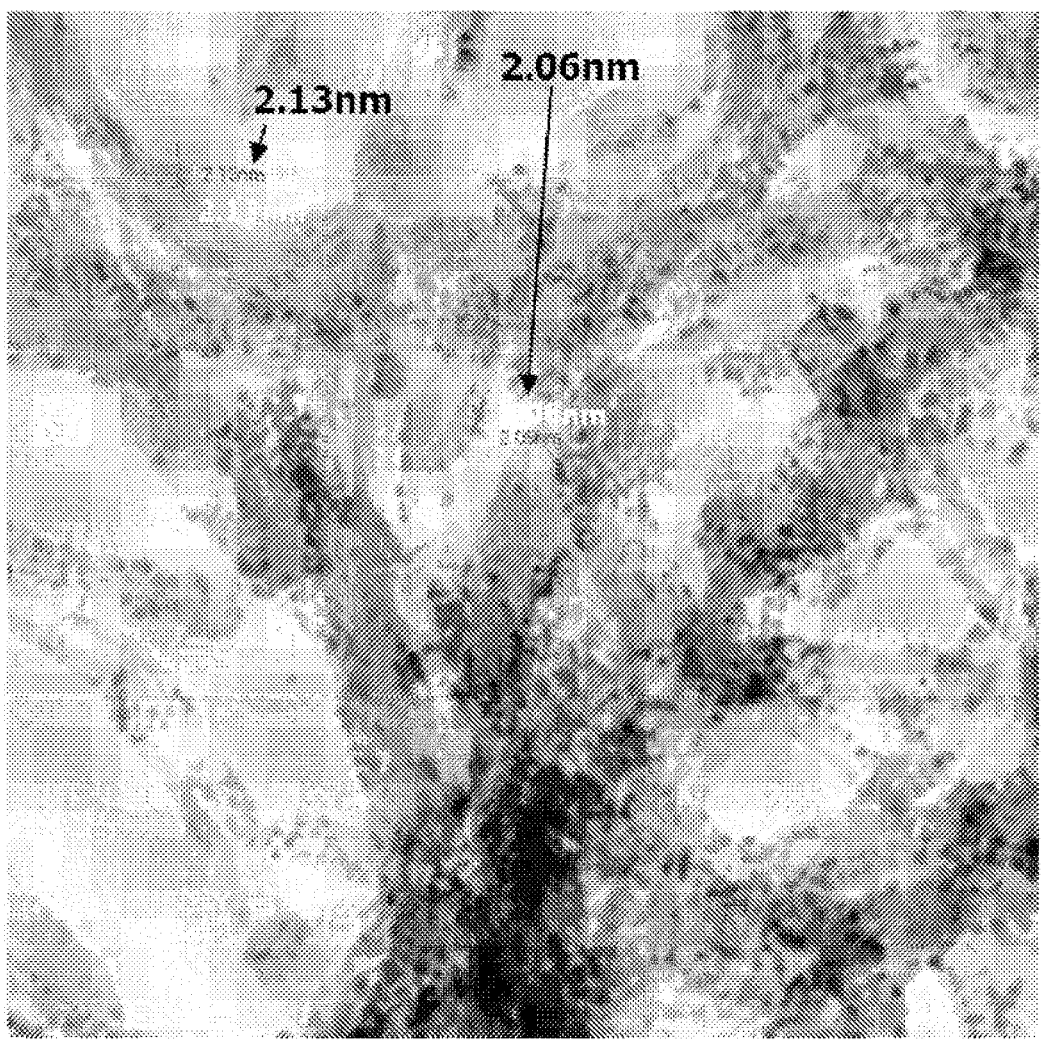

[Figure 11]
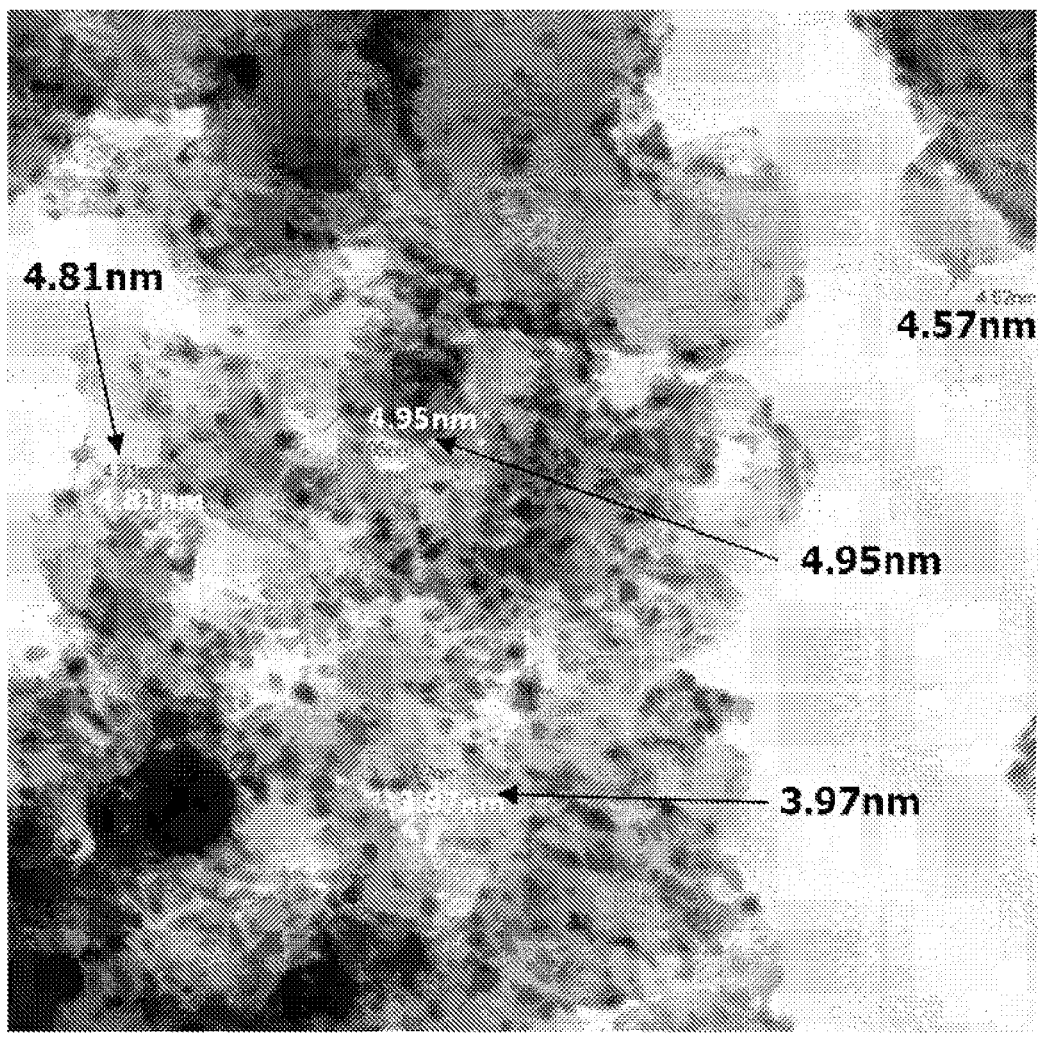

[Figure 12]
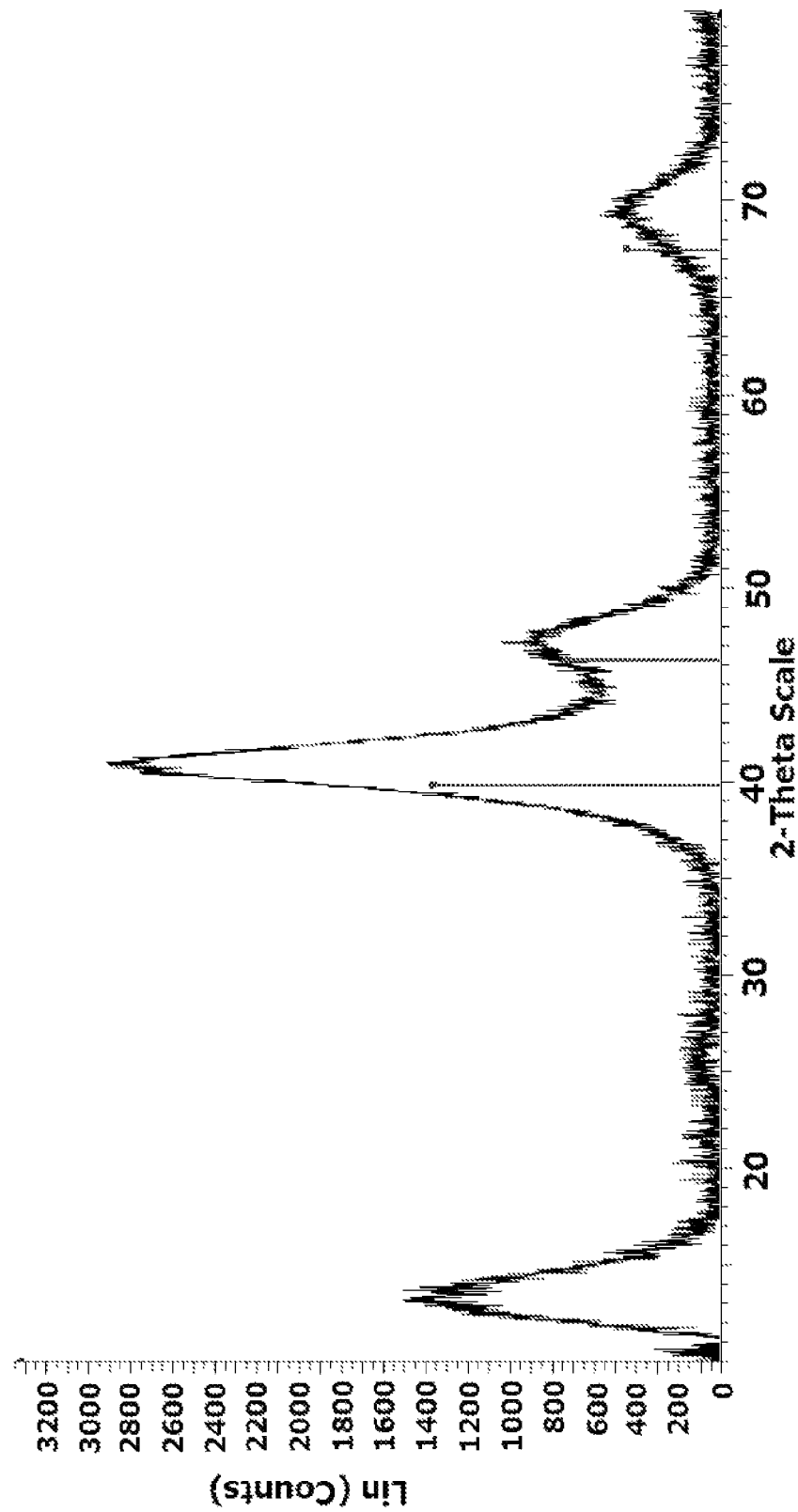

[Figure 13]
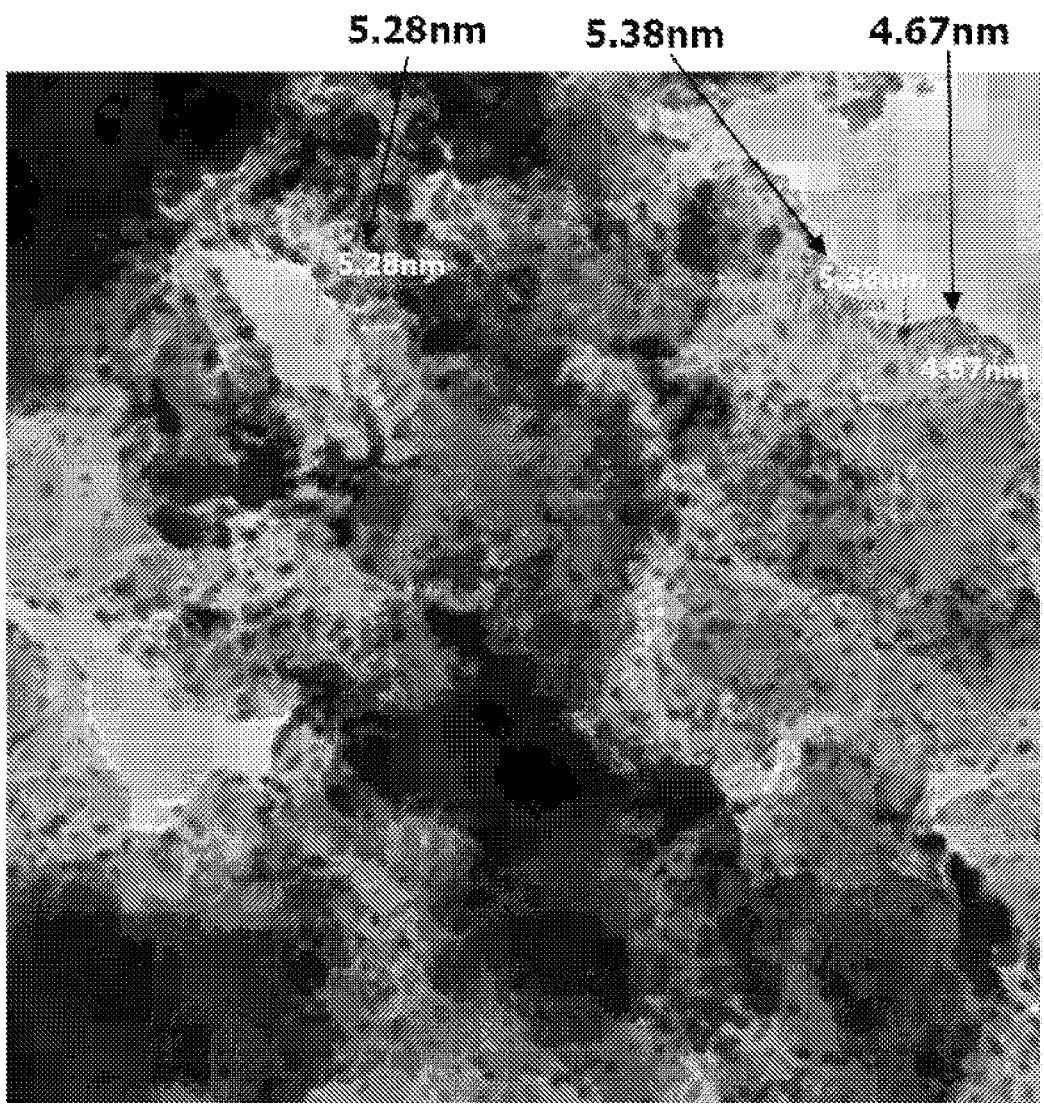

[Figure 14]
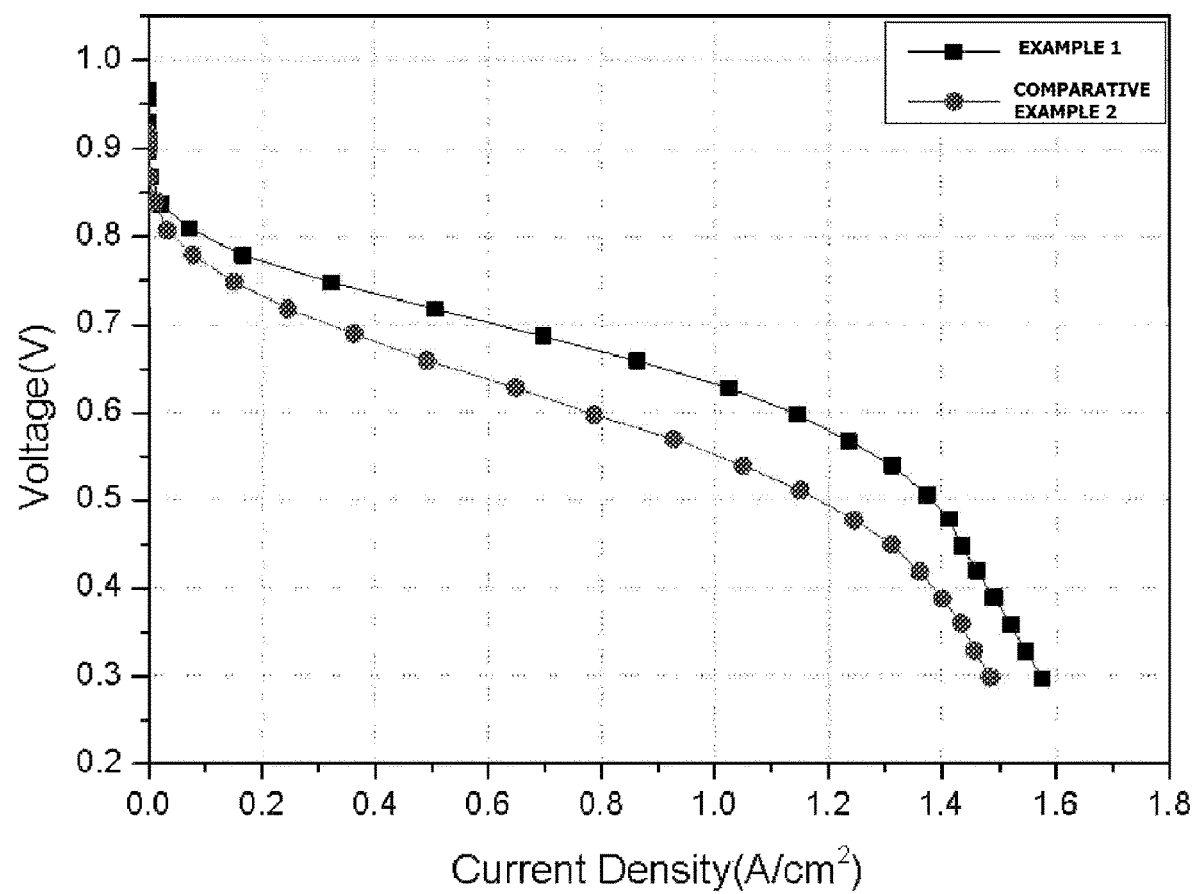

[Figure 15]
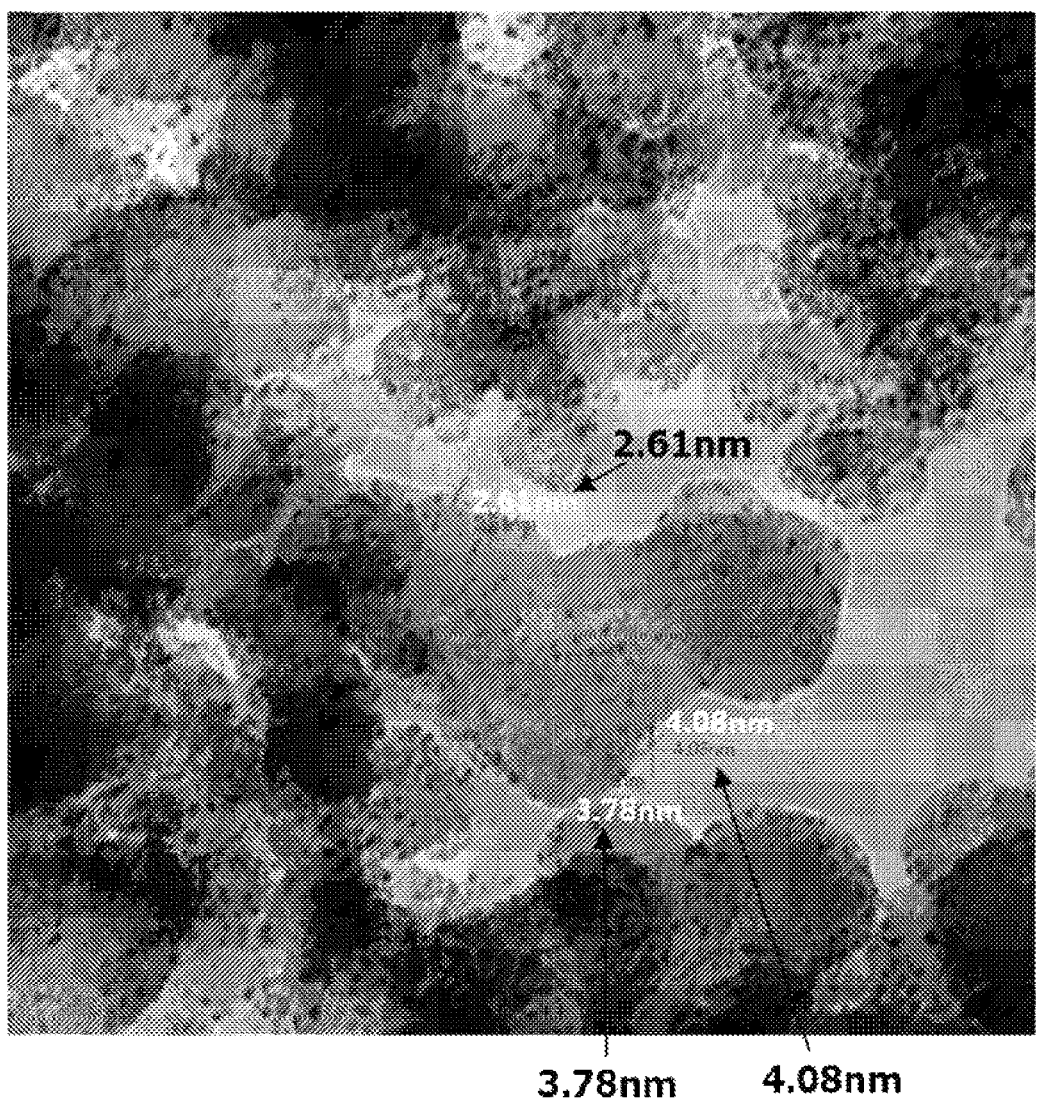

[Figure 16]
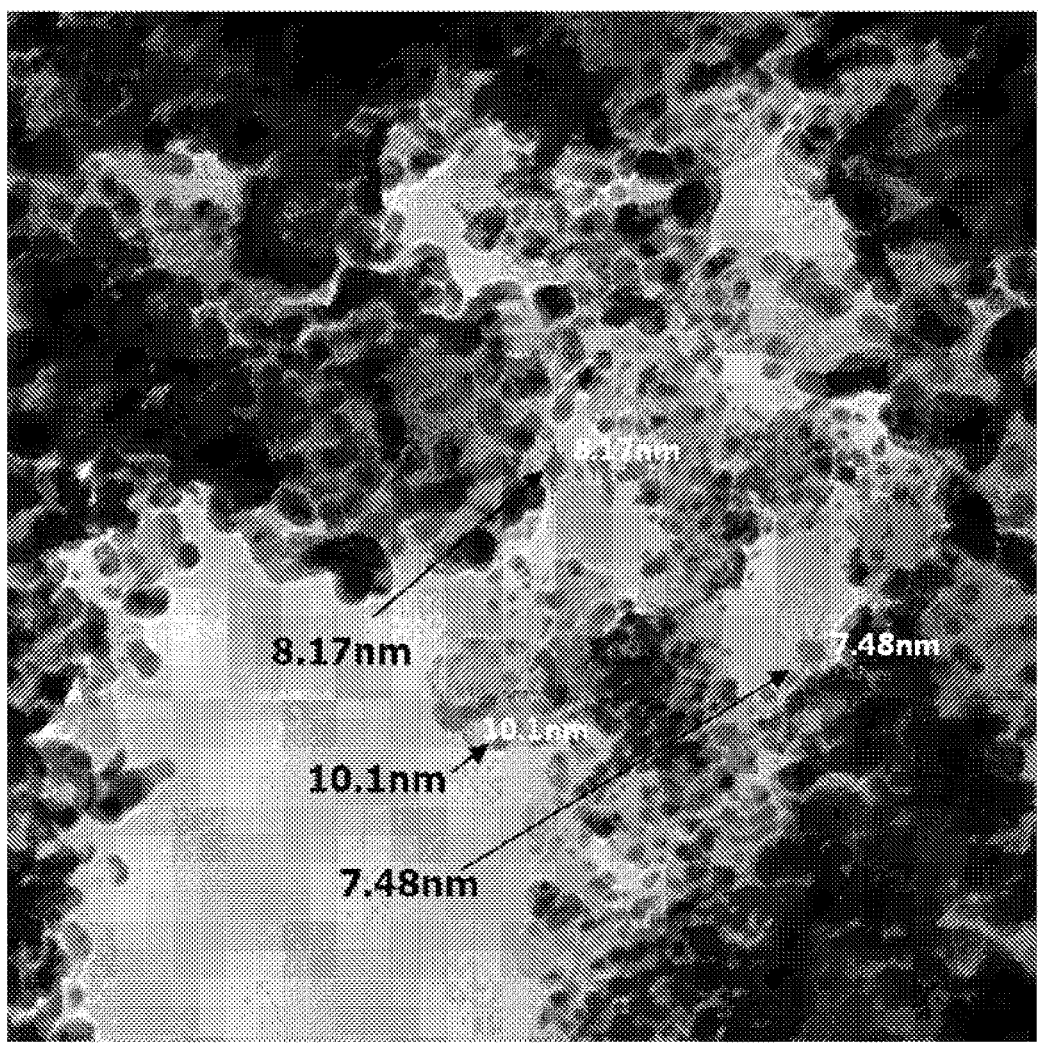

[Figure 17]
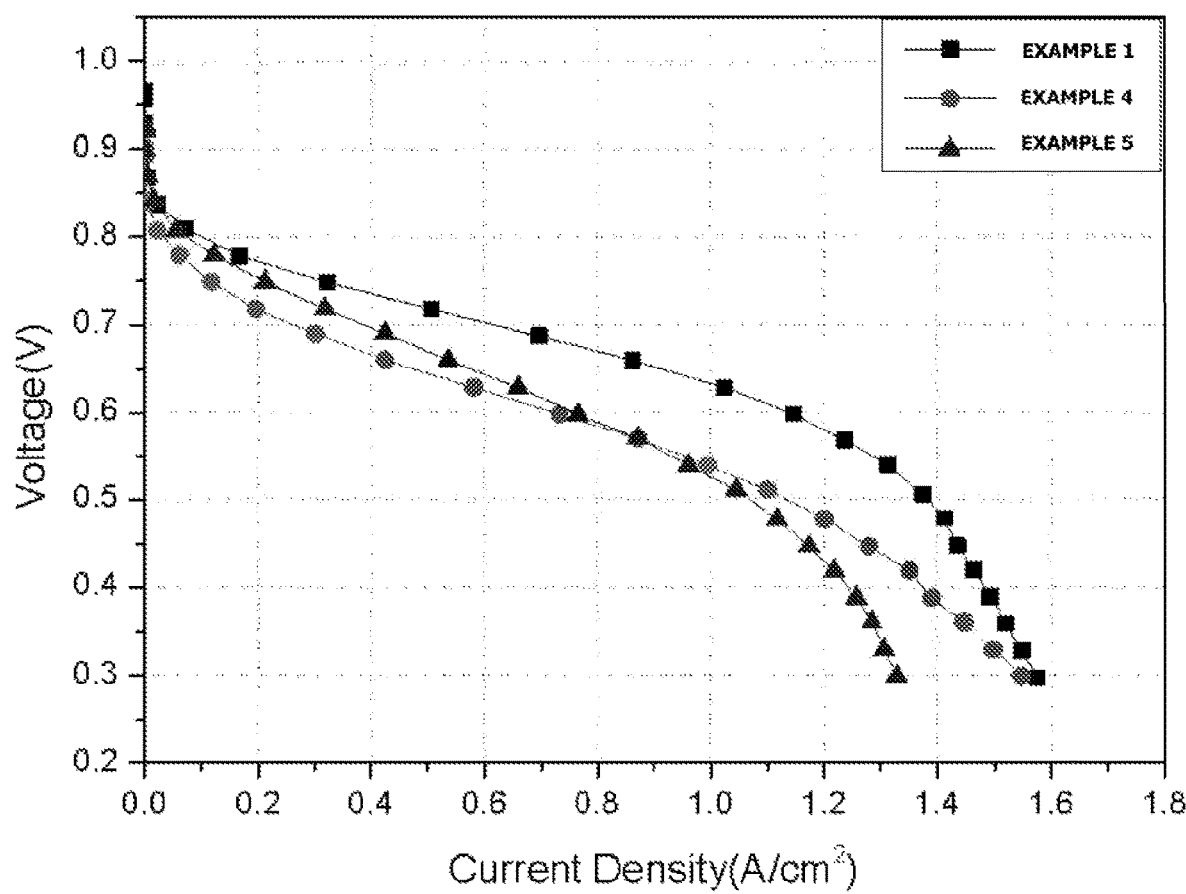

[Figure 18]
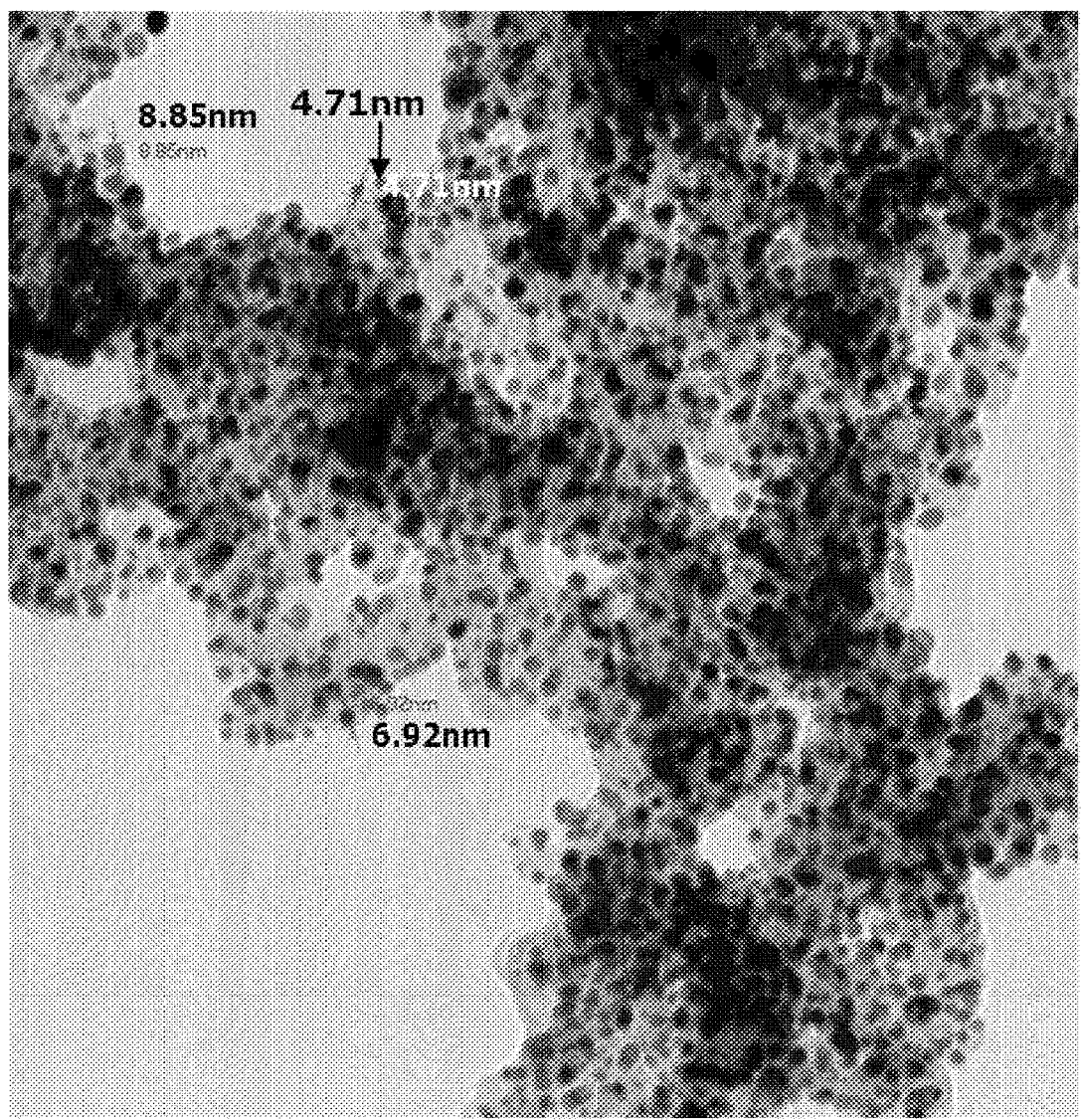

CARRIER-NANOPARTICLE COMPOSITE, CATALYST CONTAINING SAME, AND METHOD FOR PRODUCING SAME This application is a National Stage Application of International Application No. PCT/KR2017/001152 filed on Feb. 2, 2017, which claims priority to and the benefit of Korean Patent Application No. 10-2016-0012913 filed in the Korean Intellectual Property Office on Feb. 2, 2016, both of which are incorporated herein in their entirety by reference for all purposes as if fully set forth herein.

TECHNICAL FIELD

The present specification relates to a carrier-nanoparticle complex, a catalyst including the same, an electrochemical battery or a fuel cell including the catalyst, and a method for preparing the same.

BACKGROUND ART

Carbon black is generally used as a support of a fuel cell catalyst. However, when carbon black is used as a support, there occurs a problem with the durability due to the corrosion of carbon.

In order to alleviate the problem, studies on carbon nanotube (CNT), carbon nanofiber (CNF), carbon nanocage (CNC), and the like, which are crystalline carbon forms having a high corrosion resistance, have been actively conducted. However, these crystalline carbon forms have a problem in that these carbon forms are not dispersed well in a polar solvent due to the strong surface water repellency thereof. For this reason, there is a problem in that platinum is agglomerated without being uniformly dispersed in the process of loading platinum into a carbon support.

DETAILED DESCRIPTION OF THE INVENTION

Technical Problem

The present specification has been made in an effort to provide a carrier-nanoparticle complex, a catalyst including the same, an electrochemical battery or a fuel cell including the catalyst, and a method for preparing the same.

Technical Solution

The present specification provides a carrier-nanoparticle complex including: a carbon carrier having a polymer layer provided on a surface thereof; and metal nanoparticles provided on the polymer layer of the carbon carrier, in which the polymer layer includes a polyalkyleneimine, and a content of a nitrogen element (N) of the polymer layer is 0.5 wt % or more based on a total mass of the carbon carrier having the polymer layer.

Further, the present specification provides a catalyst including the carrier-nanoparticle complex.

In addition, the present specification provides an electrochemical battery including the catalyst.

Furthermore, the present specification provides a membrane electrode assembly including: an anode; a cathode; and a polymer electrolyte membrane provided between the anode and the cathode, in which at least one of the anode and the cathode includes the catalyst.

Further, the present specification provides a fuel cell including the membrane electrode assembly.

In addition, the present specification provides a method for preparing a carrier-nanoparticle complex, the method including: forming a polymer layer including a polyalkyleneimine in a carbon carrier; and forming metal nanoparticles on the polymer layer of the carbon carrier by adding the carbon carrier having the polymer layer formed and a metal precursor to a solvent, in which a content of a nitrogen element (N) of the polymer layer is 0.5 wt % or more based on a total mass of the carbon carrier having the polymer layer formed.

Advantageous Effects

A carrier-nanoparticle complex according to an exemplary embodiment of the present specification has an advantage in that the dispersibility of metal nanoparticles is excellent.

The carrier-nanoparticle complex according to an exemplary embodiment of the present specification has an advantage in that the thermal stability is excellent.

The carrier-nanoparticle complex according to an exemplary embodiment of the present specification has an advantage in that the durability is excellent.

The carrier-nanoparticle complex according to an exemplary embodiment of the present specification has an advantage in that process costs may be reduced because a surfactant is not used, and thus there is no process of removing the surfactant.

A method for preparing a carrier-nanoparticle complex according to an exemplary embodiment of the present specification can prepare a carrier-nanoparticle complex by a simple process, and as a result, the carrier-nanoparticle complex is easily mass-produced.

BRIEF DESCRIPTION OF DRAWINGS

FIG. 1 is a schematic view illustrating an electricity generation principle of a fuel cell.

FIG. 2 is a view schematically illustrating a structure of a membrane electrode assembly for a fuel cell.

FIG. 3 is a view schematically illustrating an example of a fuel cell.

FIG. 4 is a graph of current density in Experimental Example 1.

FIG. 5 is a graph of measuring the activity per mass in consideration of an amount of Pt loaded in Experimental Example 1.

FIG. 6 is an initial TEM image of Example 1 in Experimental Example 2.

FIG. 7 is a TEM image of Example 1 after 1,000 times in Experimental Example 2.

FIG. 8 is an initial TEM image of Comparative Example 1 in Experimental Example 2.

FIG. 9 is a TEM image of Comparative Example 1 after 1,000 times in Experimental Example 2.

FIG. 10 is a TEM image of Example 2.

FIG. 11 is a TEM image of Example 3.

FIG. 12 is an XRD pattern image of Example 3.

FIG. 13 is a TEM image of Comparative Example 2.

FIG. 14 is a graph of the current densities of Example 1 and Comparative Example 2.

FIG. 15 is a TEM image of Example 4.

FIG. 16 is a TEM image of Example 5.

FIG. 17 is a graph of the current densities of Examples 1, 4, and 5.

FIG. 18 is a TEM image of Comparative Example 3.

EXPLANATION OF REFERENCE NUMERALS
AND SYMBOLS

10: Electrolyte membrane
20, 21: Catalyst layer
40, 41: Gas diffusion layer
50: Cathode
51: Anode
60: Stack
70: Oxidizing agent supplying part
80: Fuel supplying part
81: Fuel tank
82: Pump

BEST MODE FOR CARRYING OUT THE INVENTION

Hereinafter, the present specification will be described in detail.

The present specification provides a carrier-nanoparticle complex including: a carbon carrier having a polymer layer provided on a surface thereof; and metal nanoparticles provided on the polymer layer of the carbon carrier, in which the polymer layer includes at least one of a polyalkyleneimine and a polymer having a phosphine group.

According to the carrier-nanoparticle complex according to an exemplary embodiment of the present specification, it is possible to induce bonding of the metal nanoparticles to at least one of an amine group of a polyalkyleneimine and a phosphine group of a polymer having a phosphine group by forming the polymer layer including at least one of a polyalkyleneimine and the polymer having a phosphine group on one region of the surface of the carrier. Accordingly, the aggregation phenomenon of the metal nanoparticles may be alleviated to enhance the dispersibility of the metal nanoparticles.

In the present specification, an average size of the carrier-nanoparticle complex means an average of the lengths of the longest lines among lines which link two points on the surface of the carrier-nanoparticle complex.

The carbon carrier may include one or more selected from the group consisting of carbon black, carbon nanotube (CNT), graphite, graphene, activated carbon, mesoporous carbon, carbon fiber, and carbon nano wire.

A portion or the entirety of the surface of the carbon carrier may be provided with a polymer layer. 50% or more and 100% or less of the surface of the carbon carrier may be provided with a polymer layer, and specifically, 75% or more and 100% or less thereof may be provided with a polymer layer.

The polymer layer may include at least one of a polyalkyleneimine and a polymer having a phosphine group.

The polyalkyleneimine may be a polymer having an aliphatic hydrocarbon main chain and including at least 10 amine groups or more at the main chain and side chain thereof. At this time, the amine group includes a primary amine group, a secondary amine group, a tertiary amine group, and a quaternary amine group, and in the amine group included in the main chain and side chain of the polyalkyleneimine, at least one of the primary amine group, the secondary amine group, the tertiary amine group, and the quaternary amine group may be 10 or more.

The polyalkyleneimine may have a weight average molecular weight of 500 or more and 1,000,000 or less.

The polyalkyleneimine may include a repeating unit represented by the following Chemical Formula 1 and a repeating unit represented by the following Chemical Formula 2.

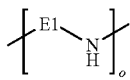
[Chemical Formula 1]

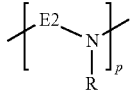
[Chemical Formula 2]

In Chemical Formula 1 and 2, E1 and E2 are each independently an alkylene group having 2 to 10 carbon atoms, R is a substituent represented by any one of the following Chemical Formula 3 to 5, and o and p are each an integer from 1 to 1,000,

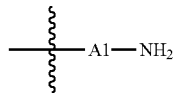
[Chemical Formula 3]

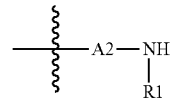
[Chemical Formula 4]

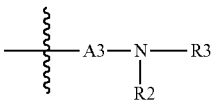
[Chemical Formula 5]

in Chemical Formula 3 to 5, A1 to A3 are each independently an alkylene group having 2 to 10 carbon atoms, and R1 to R3 are each independently a substituent represented by any one of the following Chemical Formula 6 to 8,

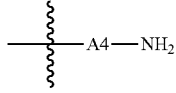
[Chemical Formula 6]

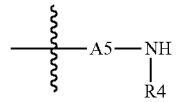
[Chemical Formula 7]

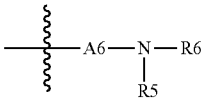
[Chemical Formula 8]

in Chemical Formula 6 to 8, A4 to A6 are each independently an alkylene group having 2 to 10 carbon atoms, and R4 to R6 are each independently a substituent represented by the following Chemical Formula 9,

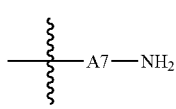
[Chemical Formula 9]

in Chemical Formula 9, A7 is an alkylene group having 2 to 10 carbon atoms.

The polyalkyleneimine may be a compound represented by the following Chemical Formula 11.

[Chemical Formula 11]

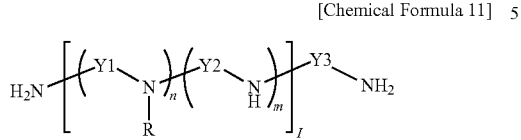

In Chemical Formula 11, Y1, Y2, and Y3 are each independently an alkylene group having 2 to 10 carbon atoms, R is a substituent represented by any one of the following Chemical Formula 3 to 5, n and m are each an integer from 1 to 5, and l is an integer from 1 to 200,

[Chemical Formula 3]
[Chemical Formula 4]
[Chemical Formula 5]

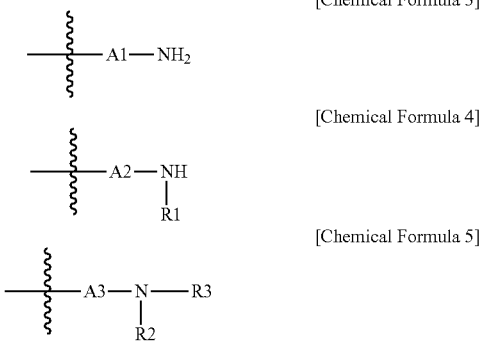

in Chemical Formula 3 to 5, A1 to A3 are each independently an alkylene group having 2 to 10 carbon atoms, and R1 to R3 are each independently a substituent represented by any one of the following Chemical Formula 6 to 8,

[Chemical Formula 6]
[Chemical Formula 7]
[Chemical Formula 8]

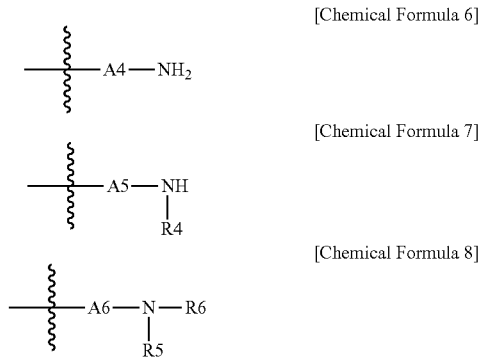

in Chemical Formula 6 to 8, A4 to A6 are each independently an alkylene group having 2 to 10 carbon atoms, and R4 to R6 are each independently a substituent represented by the following Chemical Formula 9,

[Chemical Formula 9]

in Chemical Formula 9, A7 is an alkylene group having 2 to 10 carbon atoms.

In the present specification,

means a substitution position of a substituent.

In the present specification, the alkylene group may be straight or branched, and the number of carbon atoms thereof is not particularly limited, but is preferably 2 to 10. Specific examples thereof include an ethylene group, a propylene group, an isopropylene group, a butylene group, a t-butylene group, a pentylene group, a hexylene group, a heptylene group, and the like, but are not limited thereto.

Based on the total mass of a carbon carrier having a polymer layer, the content of a nitrogen element (N) of the polymer layer may be 0.5 wt % or more. Specifically, based on the total mass of the carbon carrier having the polymer layer, the content of the nitrogen element (N) of the polymer layer may be 0.5 wt % or more and 5 wt % or less, more specifically, 0.5 wt % or more and 3 wt % or less. In this case, there is an advantage in that a support rate may be increased while metal nanoparticles are uniformly distributed on the polymer layer.

The phosphine means hydrogen phosphide in a narrow sense, but also includes a compound in which the hydrogen atom is substituted with one or more hydrocarbon groups by using $PH_3$ as a matrix.

In the present specification, the phosphine group means a functional group which includes a phosphorus element (P) by substituting a hydrogen atom of $PH_3$ with one or more hydrocarbon groups. The phosphine group may be classified into a primary phosphine, a secondary phosphine, a tertiary phosphine, and a quaternary phosphine according to the number of hydrocarbon groups bonded to a phosphorus element (P) of the phosphine.

The polymer having the phosphine group may have an aliphatic hydrocarbon main chain. Specifically, the polymer having the phosphine group may be a polymer having an aliphatic hydrocarbon main chain and including at least 10 amine groups or more at the main chain and side chain thereof.

The polymer having the phosphine group may have a weight average molecular weight of 500 or more and 1,000,000 or less.

The metal nanoparticles may be bonded to at least one of an amine group of the polyalkyleneimine and a phosphine group of the polymer having the phosphine group.

The metal nanoparticle may include one or two or more metals selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). Specifically, the metal nanoparticle may include platinum (Pt); and a platinum alloy in which iron (Fe), cobalt (Co), nickel (Ni), palladium (Pd), rhodium (Rh), or ruthenium (Ru) is alloyed with platinum (Pt).

The metal nanoparticles may have an average particle diameter of 2 nm or more and 20 nm or less, and specifically, 3 nm or more and 10 nm or less. In this case, there is an advantage in that the catalyst efficiency is high, because metal nanoparticles are not aggregated with each other and are dispersed well on a carbon carrier.

The metal nanoparticle may have a spherical shape. In the present specification, the spherical shape does not mean only a perfect spherical shape, and may include a roughly spherical shape. For example, in the metal nanoparticle, the outer surface having a spherical shape may not be smooth, and the radius of curvature in one metal nanoparticle may not be constant.

The content of the metal nanoparticles may be 15 wt % or more and 50 wt % or less based on the total weight of the carrier-nanoparticle complex. Specifically, the content of the metal nanoparticles may be 20 wt % or more and 40 wt % or less based on the total weight of the carrier-nanoparticle complex.

The present specification provides a catalyst including the carrier-nanoparticle complex.

The present specification provides an electrochemical battery including the catalyst.

The electrochemical battery means a battery which uses chemical reactions, and is not particularly limited in type as long as the battery includes an electrolyte membrane, but for example, the electrochemical battery may be a fuel cell, a metal secondary battery, or a flow battery.

The present specification provides an electrochemical battery module including the electrochemical battery as a unit cell.

The electrochemical battery module may be formed by inserting a bipolar plate between flow batteries according to one exemplary embodiment of the present application to stack the batteries.

The battery module may be specifically used as a power source for an electric vehicle, a hybrid electric vehicle, a plug-in hybrid electric vehicle, or a power storage device.

The present specification provides a membrane electrode assembly including: an anode; a cathode; and a polymer electrolyte membrane provided between the anode and the cathode, in which at least one of the anode and the cathode includes the catalyst.

The present specification provides a fuel cell including the membrane electrode assembly.

FIG. 1 schematically illustrates an electricity generation principle of a fuel cell, and in a fuel cell, the most fundamental unit of generating electricity is a membrane electrode assembly (MEA), and the membrane electrode assembly is composed of an electrolyte membrane (M), and an anode (A) and a cathode (C) formed on both surfaces of the electrolyte membrane (M). Referring to FIG. 1 which illustrates an elasticity generation principle of a fuel cell, an oxidation reaction of fuel (F) such as hydrogen or a hydrocarbon such as methanol and butane occurs in the anode (A), and as a result, hydrogen ions ($H^+$) and electrons ($e^-$) are generated, and the hydrogen ions move to the cathode (C) through the electrolyte membrane (M). In the cathode (C), hydrogen ions transferred through the electrolyte membrane (M), an oxidizing agent (O) such as oxygen, and electrons are reacted to produce water (W). Electrons move to an external circuit by the reaction.

FIG. 2 schematically illustrates a structure of a membrane electrode assembly for a fuel cell, and the membrane electrode assembly for the fuel cell may include an electrolyte membrane (10), and a cathode (50) and an anode (51) facing each other with the electrolyte membrane (10) interposed therebetween. In the cathode, a cathode catalyst layer (20) and a cathode gas diffusion layer (40) may be provided sequentially from the electrolyte membrane (10), and in the anode, an anode catalyst layer (21) and an anode gas diffusion layer (41) may be provided sequentially from the electrolyte membrane (10).

The catalyst according to the present specification may be included in at least one of a cathode catalyst layer and an anode catalyst layer in a membrane electrode assembly.

FIG. 3 schematically illustrates a structure of a fuel cell, and the fuel cell includes a stack (60), an oxidizing agent supplying part (70), and a fuel supplying part (80).

The stack (60) includes the aforementioned one membrane electrode assembly or two or more membrane electrode assemblies, and when two or more membrane electrode assemblies are included, the stack (60) includes a separator interposed therebetween. The separator serves to prevent the membrane electrode assemblies from being electrically connected to each other, and to transfer fuel and an oxidizing agent, which are supplied from the outside, to the membrane electrode assemblies.

The oxidizing agent supplying part (70) serves to supply an oxidizing agent to the stack (60). As the oxidizing agent, oxygen is representatively used, and oxygen or air may be used by being injected into the oxidizing agent supplying part (70).

The fuel supplying part (80) serves to supply fuel to the stack (60), and may be composed of a fuel tank (81) which stores fuel, and a pump 82 which supplies the stack (60) with fuel stored in the fuel tank (81). As the fuel, hydrogen or hydrocarbon fuel in a gas or liquid state may be used. Examples of the hydrocarbon fuel may include methanol, ethanol, propanol, butanol, or natural gases.

The present specification provides a method for preparing a carrier-nanoparticle complex, the method including: forming a polymer layer including at least one of a polyalkyleneimine and a polymer having a phosphine group on a carbon carrier; and forming metal nanoparticles on the polymer layer of the carbon carrier by adding the carbon carrier having the polymer layer formed and a metal precursor to a solvent.

For the method for preparing the carrier-nanoparticle complex, it is possible to cite those described above for the carrier-nanoparticle complex.

The method for preparing the carrier-nanoparticle complex includes forming a polymer layer including at least one of a polyalkyleneimine and a polymer having a phosphine group on a carbon carrier.

The method for preparing the carrier-nanoparticle complex may include: preparing a first solution by adding at least one polymer of a carbon carrier, a polyalkyleneimine, and a polymer having a phosphine group to a solvent; and stirring the first solution.

The first solution may further include a salt. The salt may be a nitrate of an alkali metal, and specifically, the salt may be at least one of $KNO_3$, $NaNO_3$, and $Ca(NO_3)_2$.

The solvent of the first solution is not particularly limited, but may include at least one of water, ethanol, 2-propanol, and iso-propanol.

Based on the total weight of the first solution, the content of the carbon carrier may be 0.05 wt % or more and 0.5 wt % or less.

Based on the total weight of the first solution, the content of the polymer may be 0.1 wt % or more and 1 wt % or less.

Based on the total weight of the first solution, the content of the salt may be 0.1 wt % or more and 1 wt % or less.

Based on the total weight of the first solution, the content of the solvent may be 98 wt % or more and 99 wt % or less.

The time for which the first solution is stirred may be 3 hours or more and 72 hours or less.

The method for preparing the carrier-nanoparticle complex includes forming metal nanoparticles on the polymer layer of the carbon carrier by adding the carbon carrier having the polymer layer formed and a metal precursor to a solvent.

The forming of the metal nanoparticles on the polymer layer of the carbon carrier may include: preparing a second solution by adding the carbon carrier having the polymer layer formed and a metal precursor to a solvent; adjusting a pH of the second solution; and stirring the second solution.

The metal precursor is a material before being reduced to metal nanoparticles, and the metal precursor may be selected according to the type of metal nanoparticle.

The solvent of the second solution may include a polyhydric alcohol having two or more hydroxy groups. The polyhydric alcohol is not particularly limited as long as the polyhydric alcohol has two or more hydroxy groups, but may include at least one of ethylene glycol, diethylene glycol, and propylene glycol.

The second solution for forming metal nanoparticles on the polymer layer of the carbon carrier does not include a surfactant. In this case, there is an advantage in that a step of removing a surfactant after synthesizing a catalyst is not necessary, and there is no reduction in active point caused by a surfactant.

Based on the total weight of the second solution, the content of the carbon carrier having the polymer layer formed may be 0.1 wt % or more and 3 wt % or less.

Based on the total weight of the second solution, the content of the metal precursor may be 0.05 wt % or more and 3 wt % or less.

Based on the total weight of the second solution, the content of the solvent may be 95 wt % or more and 99.8 wt % or less.

In the adjusting of the pH of the second solution, the pH of the second solution may be adjusted to 10 to 11, and the method for adjusting the pH is not particularly limited as long as the method may adjust the pH of the second solution, but the pH of the second solution may be adjusted by adding a predetermined amount of NaOH thereto.

The method for preparing the carrier-nanoparticle complex may further include forming metal nanoparticles on a polymer layer of a carbon carrier, and then removing a solvent.

In the removing of the solvent, the solvent is removed, and the metal nanoparticles provided on the polymer layer of the carbon carrier may be sintered.

The removing of the solvent may be carrying out a heat treatment under a hydrogen or argon atmosphere. At this time, the heat treatment temperature may be 180° C. or more and 300° C. or less. At less than 180° C., the solvent may not be completely removed, and at more than 300° C., the polymer on the surface of the carbon carrier may be decomposed or modified.

MODE FOR INVENTION

Hereinafter, the present specification will be described in more detail through Examples. However, the following Examples are provided only for exemplifying the present specification, but are not intended to limit the present specification.

EXAMPLE

Example 1

3 g of polyethyleneimine (PEI, Mw. 1800) represented by the following Chemical Formula 12 was dissolved in 600 ml of water, and then 720 mg of raw carbon black and 6 g of KNO$_3$ were added thereto, and the resulting mixture was stirred for 24 hours. The mixture was washed with distilled water and dried to obtain a carbon carrier which was coated with PEI.

[Chemical Formula 12]

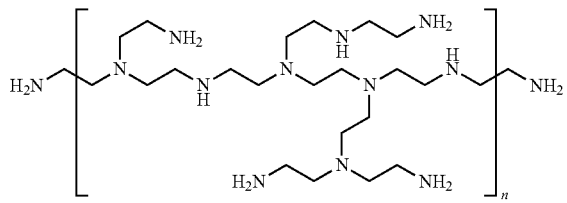

After 65 mg of the carbon carrier coated with PEI was dispersed in 25 ml of ethylene glycol, a pH was adjusted to 10 to 11 by dissolving 0.22 mmol of PtCl$_4$ and 1.25 mmol of NaOH therein, and the resulting solution was stirred for a predetermined time. The solution was stirred for 3 hours by warming the solution to 160° C., and then cooled. The product was washed with ethanol (EtOH) and dried, and then subjected to a heat treatment under a hydrogen atmosphere for 1 hour to obtain a carrier-nanoparticle complex. As a result of inductively coupled plasma-optical emission spectroscopy (ICP-OES), Pt was supported in an amount of 40 wt %.

Example 2

A carrier-nanoparticle complex was prepared in the same manner as in the method in Example 1, except that raw carbon nanotube (CNT) was used instead of raw carbon black in Example 1.

Example 3

A carrier-nanoparticle complex was prepared in the same manner as in the method in Example 1, except that 0.13 mmol of PtCl$_4$ and 0.1 mmol of CoCl$_2$ were used instead of 0.22 mmol of PtCl$_4$ in Example 1. Considering that the <111> peak of Pt shifted to a high angle in the XRD pattern of FIG. 12, it can be confirmed that the peak is a PtCo alloy particle.

Example 4

A carrier-nanoparticle complex was prepared in the same manner as in the method in Example 1, except that 0.06 mmol of PtCl$_4$ was used instead of 0.22 mmol of PtCl$_4$ in Example 1. As a result of inductively coupled plasma-optical emission spectroscopy (ICP-OES), Pt was supported in an amount of 12 wt %.

Example 5

A carrier-nanoparticle complex was prepared in the same manner as in the method in Example 1, except that 0.5 mmol of PtCl$_4$ was used instead of 0.22 mmol of PtCl$_4$ in Example 1. As a result of inductively coupled plasma-optical emission spectroscopy (ICP-OES), Pt was supported in an amount of 58 wt %.

Comparative Example 1

An acid-treated carbon black was prepared by putting 1 g of raw carbon black into 100 ml of 5 M HNO$_3$, stirring the resulting mixture at 120° C. for 5 hours, and then washing the mixture several times with distilled water, and drying the mixture. After 0.22 mmol of a Pt precursor and 65 mg of the acid-treated carbon black were dissolved in 25 ml of ethylene glycol, the pH was adjusted to 11, and then the resulting solution was stirred for a predetermined time. After the solution was warmed to 160° C., the solution was stirred for 3 hours, and then cooled. The product was washed with ethanol (EtOH) and dried, and then subjected to a heat treatment under a hydrogen atmosphere for 1 hour to obtain a carrier-nanoparticle complex.

Comparative Example 2

10 g of a 35% solution of polydiallyldimethylammonium chloride (PDDA, Mw. 100,000) was dissolved in 600 ml of water, and then 720 mg of raw carbon black and 6 g of $KNO_3$ were added thereto, and the resulting mixture was stirred for 24 hours. The resulting product was washed with distilled water and dried to obtain a carbon carrier coated with PDDA.

After 65 mg of the carbon carrier coated with PDDA was dispersed in 25 ml of ethylene glycol, a pH was adjusted to 10 to 11 by dissolving 0.22 mmol of $PtCl_4$ and 1.25 mmol of NaOH therein, and the resulting mixture was stirred for a predetermined time. The solution was stirred for 3 hours by warming the solution to 160° C., and then cooled. The product was washed with ethanol (EtOH) and dried, and then subjected to a heat treatment under a hydrogen atmosphere for 1 hour to obtain a carrier-nanoparticle complex.

Referring to the TEM in FIG. 13, particles with a size of 5 nm were relatively uniformly supported, but portions in which some of the particles were aggregated were also observed.

Comparative Example 3

3 g of a linear-type polyethyleneimine (PEI, Mw. 2500) of the following Chemical Formula 13 was dissolved in 600 ml of water, and then 720 mg of raw carbon black and 6 g of $KNO_3$ were added thereto, and the resulting mixture was stirred for 24 hours. The resulting product was washed with distilled water and dried to obtain a carbon carrier coated with PEI.

A carrier-nanoparticle complex was prepared in the same manner as in Example 1, except that the prepared carbon carrier coated with the linear-type PEI was used.

Specifically, after 65 mg of the carbon carrier coated with PEI was dispersed in 25 ml of ethylene glycol, a pH was adjusted to 10 to 11 by dissolving 0.22 mmol of $PtCl_4$ and 1.25 mmol of NaOH therein, and the resulting mixture was stirred for a predetermined time. The solution was stirred for 3 hours by warming the solution to 160° C., and then cooled. The product was washed with ethanol (EtOH) and dried, and then subjected to a heat treatment under a hydrogen atmosphere for 1 hour to obtain a carrier-nanoparticle complex.

As a result of inductively coupled plasma-optical emission spectroscopy (ICP-OES), a target support amount was 40 wt %, but platinum (Pt) was actually supported in an amount of 15 wt %.

Referring to the TEM in FIG. 18, particles with a size of 2 to 3 nm were relatively uniformly supported, but as a result of the previous ICP analysis, Pt particles were not supported by a desired amount.

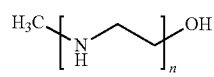

[Chemical Formula 13]

Experimental Example 1

Example 1, Comparative Examples 1 to 3, and a commercially available catalyst were each mixed with isopropyl alcohol and a 5 wt % nafion solution to prepare an ink in which the components were dispersed well, a nafion membrane was coated with the ink by using a spray apparatus, and then a membrane electrode assembly was prepared by hot-pressing the nafion membrane at 140° C.

The size of the membrane electrode assembly was 2.5 cm×2.5 cm, $H_2$/Air was supplied under a 100% humidity condition, the performance of the single cell was measured under an atmosphere of 80° C., Pt per unit area of the carrier-nanoparticle complex according to Example 1 was 0.3 mg/cm$^2$, and in the case of the commercially available catalyst and Comparative Example 1, Pt per unit area was 0.4 mg/cm$^2$.

The results are shown in FIGS. 4, 5, 14, and 17 and Tables 1 and 2, and as the commercially available catalyst, 40 wt % of Pt/C manufactured by Johnson Matthey Ltd., was used.

TABLE 1

| @0.6 V | Commercially available catalyst | Example 1 | Comparative Example 1 |
|---|---|---|---|
| Current density (A/cm$^2$) | 1.107 | 1.146 | 1.052 |
| Mass Activity (A/mgPt) | 2.768 | 3.821 | 2.629 |

Referring to Table 1, in the case of Example 1, it can be seen that the current density at 0.6 V was the largest, and the activity per mass in consideration of the amount of Pt loaded in the electrode was higher by 38% than that of the commercially available catalyst.

The results of the unit cells in Example 1 and Comparative Example 2 are illustrated in FIG. 14. When Comparative Example 2 is compared with Example 1, it can be seen that the performance of Comparative Example 2 is significantly low. Accordingly, it was confirmed that all the polymers having an amine group does not exhibit the effect, and particularly, in the case of a resin including a cyclic molecule such as PDDA, the performance was rather lowered.

The results of evaluating the performance of the unit cells in Examples 1, 4, and 5 are illustrated in FIG. 17. When Example 1 is compared with Examples 4 and 5, it can be confirmed that the performances in Examples 4 and 5 deteriorated. In the case of Example 4, metal particles were highly dispersed and supported as in FIG. 15, but the amount of platinum supported was so low that Example 4 exhibited an activity which is much less than the activity required for a fuel cell.

Further, in the case of Example 5, the support rate of platinum was 58 wt %, indicating that the content of platinum is high, but large particles having a size of 10 nm or more were produced in a large amount due to the sintering of the particles as in FIG. 16, and as a result, the activity deteriorated.

TABLE 2

| @0.6 V | Commercially available catalyst | Example 1 | Comparative Example 3 |
|---|---|---|---|
| Current density (A/cm$^2$) | 1.107 | 1.146 | 0.85 |
| N content (wt %) | — | 2.1 | 0.31 |

The activity and the content of the nitrogen element (N) in the carbon carrier in Comparative Example 3 where a linear-type PEI polymer having a small number of a nitrogen element (N) is used are shown in Table 2.

In the case of Comparative Example 3, the activity was lower than that in Example 1, resulting from the difference in amount of platinum (Pt) supported. Even in the case of Comparative Example 3, a target support amount was the same as that in Example 1, but platinum (Pt) particles were not supported in a desired amount because the amount of an amine group which can be interacted with a platinum precursor is small. The amount of the amine group including the nitrogen element (N) may affect the support of platinum (Pt), which affects the yield of the catalyst synthesis and the activity of the catalyst.

At this time, the content of the nitrogen element (N) was measured by an elemental analyzer.

Experimental Example 2

The electro-chemical surface area (ECSA) was measured in a half cell.

In the half cell, as an electrode, a 3-electrode system, that is, a reference electrode, a counter electrode, and a working electrode were used, the reference electrode was Ag/AgCl, the counter electrode was a Pt wire, and as an electrolyte, a 0.5 M sulfuric acid solution or a 0.1 M perchloric acid solution was used. The scanning was performed 1,000 cycles from −0.2 V to 1.0 V by using cyclic voltammetry, and the scan rate was 50 mV/s. After a catalyst ink was prepared as a catalyst by mixing 2 mg of the carrier-nanoparticle complex in Example 1, the carrier-nanoparticle complex in Comparative Example 1, or a commercially available catalyst, 20 µl of 5% nafion, 1.6 ml of EtOH, and 0.4 ml of H$_2$O, and dispersing the resulting mixture for 1 hour by using an ultrasonic cleaner, 7 µl to 20 µl of the catalyst ink was coated onto a rotating disk electrode (RDE), which is a working electrode, and dried. The amount of catalyst coated on the electrode was about 20 µg. The area of the electrode was 0.196 cm$^2$.

TABLE 3

| ECSA (m$^2$/g-Pt) | Commercially available catalyst | Example 1 | Comparative Example 1 |
|---|---|---|---|
| Initial value | 76.97 | 62.59 | 44.62 |
| Measured value after 1,000 cycles | 23.78 | 36.77 | 20.41 |
| Rate in decrease | 69% | 41% | 54% |

Referring to Table 3, in the case of the commercially available catalyst, the platinum active area after the 1,000 cycles was decreased by 69% compared to the initial value, and in the case of Comparative Example 1, the platinum active area after the 1,000 cycles was decreased by 54% compared to the initial value. In contrast, in the case of Example 1, it was confirmed that the platinum active area after the 1,000 cycles was decreased by 41% compared to the initial value, and accordingly, the durability was better than those in the commercially available catalyst and Comparative Example 1.

Further, for the carrier-nanoparticle complexes in Example 1 and Comparative Example 1, the initial TEM images and the transmission electron microscope (TEM) images after the 1,000 cycles are illustrated in FIGS. 6 to 9, respectively.

After the 1,000 cycles, in the case of Example 1, particles were little sintered.

Platinum particles in Comparative Example 1 had a size of 4 nm to 8 nm, and had an average diameter larger than those in Example 1, and in the case of Comparative Example 1, large particles having a size of 8 nm or more were also observed. In the case of Comparative Example 1, it can be confirmed that particles were sintered, so that the particle size was increased, and the density of metal nanoparticles distributed on the carrier was lowered.

The invention claimed is:

1. A carrier-nanoparticle complex comprising:
    a carbon carrier having a polymer layer provided on a surface thereof; and
    metal nanoparticles provided on the polymer layer of the carbon carrier,
    wherein the polymer layer comprises a polyalkyleneimine, and
    a content of a nitrogen element (N) of the polymer layer is 0.5 wt % or more based on a total mass of the carbon carrier having the polymer layer.

2. The carrier-nanoparticle complex of claim 1, wherein the polyalkyleneimine comprises a repeating unit represented by the following Chemical Formula 1 and a repeating unit represented by the following Chemical Formula 2:

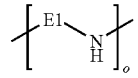

[Chemical Formula 1]

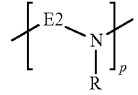

[Chemical Formula 2]

in Chemical Formula 1 and 2,
E1 and E2 are each independently an alkylene group having 2 to 10 carbon atoms,
R is a substituent represented by any one of the following Chemical Formula 3 to 5, o and p are each an integer from 1 to 1000, and

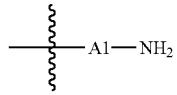

[Chemical Formula 3]

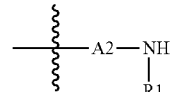

[Chemical Formula 4]

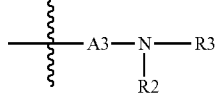

[Chemical Formula 5]

in Chemical Formula 3 to 5,
A1 to A3 are each independently an alkylene group having 2 to 10 carbon atoms,
R1 to R3 are each independently a substituent represented by any one of the following Chemical Formula 6 to 8,

[Chemical Formula 6]

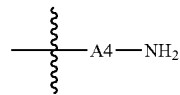

[Chemical Formula 7]

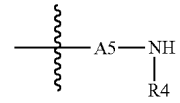

[Chemical Formula 8]

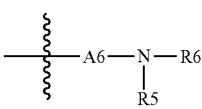

in Chemical Formula 6 to 8,
A4 to A6 are each independently an alkylene group having 2 to 10 carbon atoms, and
R4 to R6 are each independently a substituent represented by the following Chemical Formula 9,

[Chemical Formula 9]

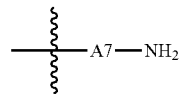

in Chemical Formula 9,
A7 is an alkylene group having 2 to 10 carbon atoms.

3. The carrier-nanoparticle complex of claim 1, wherein the polyalkyleneimine is a compound represented by the following Chemical Formula 11:

[Chemical Formula 11]

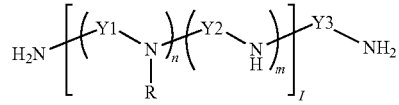

in Chemical Formula 11,
Y1, Y2, and Y3 are each independently an alkylene group having 2 to 10 carbon atoms,
R is a substituent represented by any one of the following Chemical Formula 3 to 5,
n and m are each an integer from 1 to 5,
l is an integer from 1 to 200,

[Chemical Formula 3]

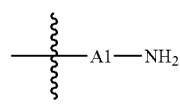

[Chemical Formula 4]

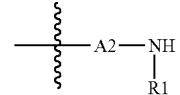

[Chemical Formula 5]

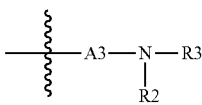

in Chemical Formula 3 to 5,
A1 to A3 are each independently an alkylene group having 2 to 10 carbon atoms,
R1 to R3 are each independently a substituent represented by any one of the following Chemical Formula 6 to 8,

[Chemical Formula 6]

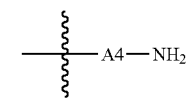

[Chemical Formula 7]

[Chemical Formula 8]

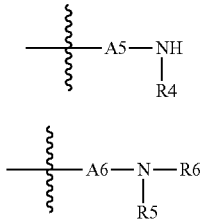

in Chemical Formula 6 to 8,
A4 to A6 are each independently an alkylene group having 2 to 10 carbon atoms, and
R4 to R6 are each independently a substituent represented by the following Chemical Formula 9,

[Chemical Formula 9]

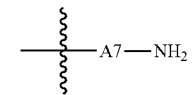

in Chemical Formula 9,
A7 is an alkylene group having 2 to 10 carbon atoms.

4. The carrier-nanoparticle complex of claim 1, wherein the metal nanoparticle is bonded to the amine group of the polyalkyleneimine.

5. The carrier-nanoparticle complex of claim 1, wherein the metal nanoparticle comprises one or two or more metals selected from the group consisting of platinum (Pt), ruthenium (Ru), rhodium (Rh), molybdenum (Mo), osmium (Os), iridium (Jr), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

6. The carrier-nanoparticle complex of claim 1, wherein the carbon carrier comprises one or more selected from the group consisting of carbon black, carbon nanotube (CNT), graphite, graphene, activated carbon, mesoporous carbon, carbon fiber, and carbon nano wire.

7. The carrier-nanoparticle complex of claim 1, wherein a content of the metal nanoparticles is 15 wt % or more and 50 wt % or less based on a total weight of the carrier-nanoparticle complex.

8. A catalyst comprising the carrier-nanoparticle complex of claim 1.

9. An electrochemical battery comprising the catalyst of claim 8.

10. A membrane electrode assembly comprising:
an anode;
a cathode; and
a polymer electrolyte membrane provided between the anode and the cathode,
wherein at least one of the anode and the cathode comprises the catalyst of claim 8.

11. A fuel cell comprising the membrane electrode assembly of claim 10.

12. A method for preparing a carrier-nanoparticle complex, the method comprising:
forming a polymer layer comprising a polyalkyleneimine in a carbon carrier; and
forming metal nanoparticles on the polymer layer of the carbon carrier by adding the carbon carrier having the polymer layer formed and a metal precursor to a solvent,
wherein a content of a nitrogen element (N) of the polymer layer is 0.5 wt % or more based on a total mass of the carbon carrier having the polymer layer formed.

13. The method of claim 12, wherein in the forming of the metal nanoparticles on the polymer layer of the carbon carrier, the solvent comprises a polyhydric alcohol having two or more hydroxy groups.

14. The method of claim 12, wherein in the forming of the metal nanoparticles on the polymer layer of the carbon carrier, a surfactant is not added to the solvent.

* * * * *